No. 855,983. PATENTED JUNE 4, 1907.
F. A. RIDER.
REFRIGERATING APPARATUS.
APPLICATION FILED NOV. 10, 1906.
2 SHEETS—SHEET 1.
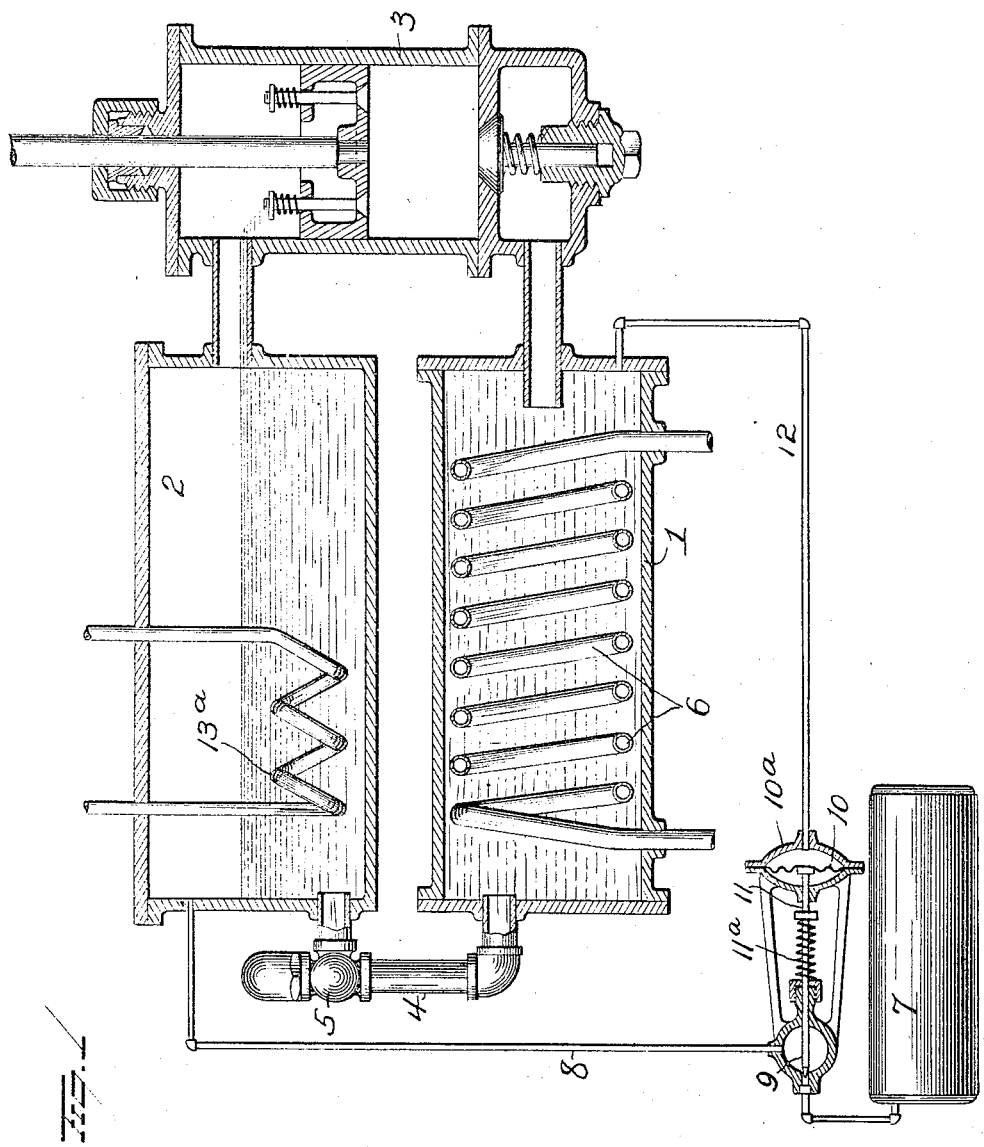
WITNESSES
E. Nottingham
G. F. Downing.
INVENTOR
F. A. Rider
By H. A. Seymour
Attorney

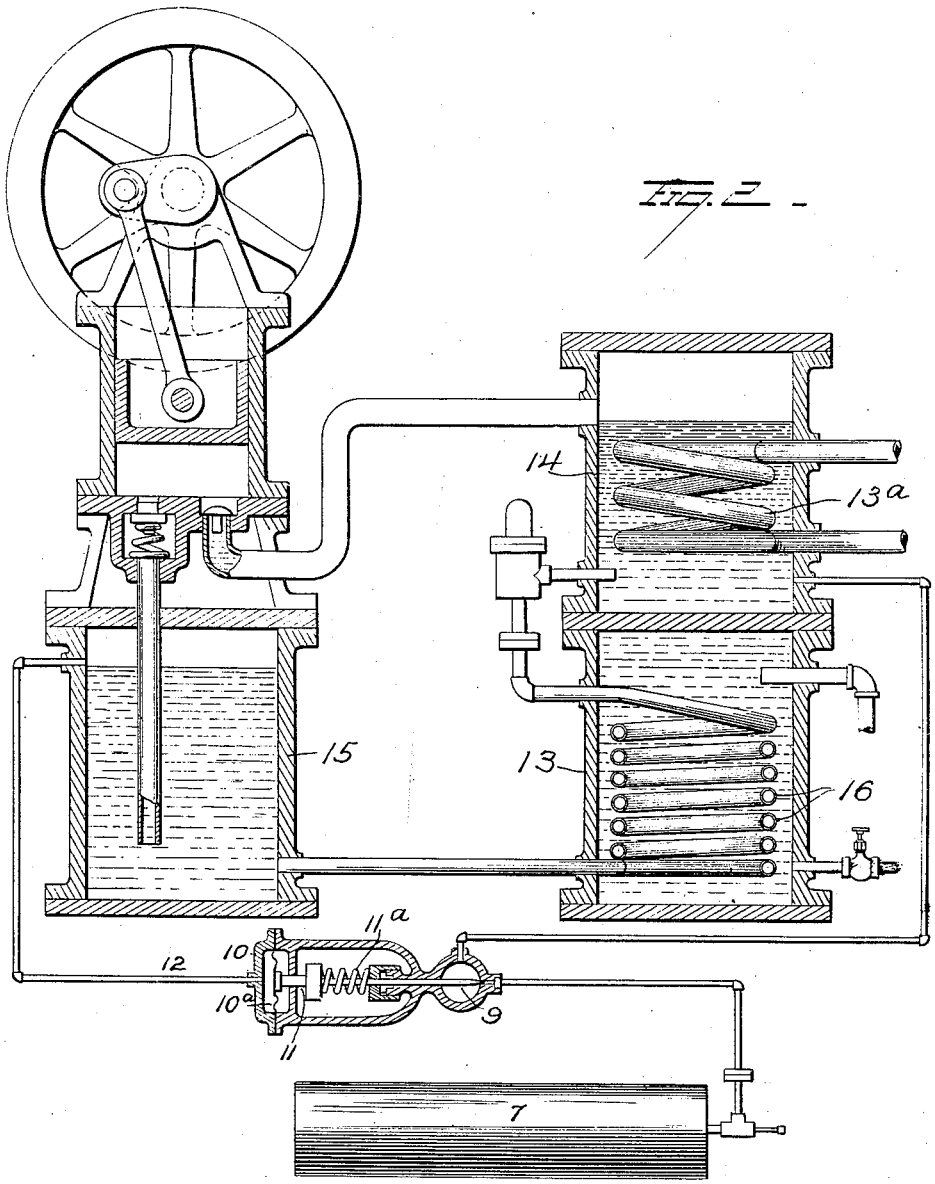

UNITED STATES PATENT OFFICE.

FRANK A. RIDER, OF PITTSBURG, PENNSYLVANIA.

REFRIGERATING APPARATUS.

No. 855,983.     Specification of Letters Patent.     Patented June 4, 1907.

Application filed November 10, 1906. Serial No. 342,849.

*To all whom it may concern:*

Be it known that I, FRANK A. RIDER, a resident of Pittsburg, in the county of Allegheny and State of Pennsylvania, have invented certain new and useful Improvements in Refrigerating Apparatus; and I do hereby declare the following to be a full, clear, and exact description of the invention, such as will enable others skilled in the art to which it appertains to make and use the same.

My invention relates to improvements in refrigerating apparatus, the object of the invention being to provide improvements of this character designed and arranged for maintaining the conditions necessary to a continuous absorption of gas, by water, under a comparatively high pressure, and a subsequent continuous release of gas under a less pressure, and means for carrying away the heat of absorption, between the two operations.

With this object in view, the invention consists in certain novel features of construction and combinations and arrangements of parts as will be more fully hereinafter described and pointed out in the claims.

In the accompanying drawings, Figure 1 is a view in section illustrating my improvements and Fig. 2 is a similar view of a modification.

It is a well known fact that water will absorb a large proportionate volume of ammonia gas at atmospheric pressure and that such absorption develops heat. It is also a fact that if the water is confined in a tight vessel and the ammonia supplied under pressure, that the amount of gas absorbed will increase and my improved apparatus is designed for the purpose of utilizing these principles in a most efficient manner.

1 represents a gas tight receptacle containing water into which ammonia gas is forced from a receptacle 2, by means of a pump 3, which also allows the overflow of water in said tank or receptacle 2 to return to receptacle 1 by gravity, thus permitting the employment of a single pump to carry out the operation of the apparatus. The water saturated with ammonia gas is conveyed from receptacle 1 to receptacle 2, through a pipe 4, in which a weighted valve 5 is located and by this means any pressure desired may be had in receptacle 1 before the water will flow to receptacle 2.

A coil of pipe 6, containing a circulating cooling liquid, is located in receptacle 1, to cool the liquid therein and carry off the heat generated by the supersaturation of the water with the ammonia gas, and losses of ammonia gas in the system, is automatically made up from a tank, 7. A pipe 8 connects the tank 7 with receptacle 2 and has a needle valve 9 controlling the passage of ammonia gas from tank 7 to receptacle 2. This needle valve 9 is operated automatically by a diaphragm 10, located in a chamber $10^a$, and against which diaphragm, the stem 11 of valve 9 is held by a spring $11^a$, and the chamber $10^a$, at the opposite side of the diaphragm, is connected by a pipe 12 with receptacle 1, so that a uniform pressure is maintained in this side of chamber $10^a$ and receptacle 1. Hence, in the event of diminution of pressure in receptacle 1, the spring $11^a$ will overcome the pressure against the opposite side of the diaphragm 10 and cause the needle valve to open and supply ammonia gas to receptacle 2; and when the pressure increases in receptacle 1, the needle valve will be automatically closed, as will be readily understood.

The operation of my improvements is as follows:—The pump 3, takes the ammonia gas from receptacle 2 and forces it into the water in receptacle 1 and due to the fact of such pressure, the water will become supersaturated with ammonia gas, and a correspondingly increased temperature will be the result, such heat being taken up by the cooling coil 6. The pump 3 also permits the overflow of water in receptacle 2, to flow by gravity through the pump as it operates, and back to receptacle 1, thus enabling one pump to do all the necessary work of the apparatus. The ammonia charged water will pass up through pipe 4, into receptacle 2 and there the ammonia gas will be released, to correspondingly decrease the temperature of the water, and the latter may be employed as a refrigerating agent in any desired manner, or a coil $13^a$ containing brine or other liquid, may be cooled in the receptacle 2 and used as the refrigerating agent.

As above stated, such losses of ammonia gas as may occur in the apparatus, may be automatically made up from tank 7, through the pipe 8, which is controlled by the pressure in receptacle 1, and the operation can therefore be continued indefinitely at maximum capacity.

In the modification illustrated in Fig. 2, a separate chamber 13 is employed to cool the supersaturated water before it passes to the expansion chamber 14. The supersaturated water passes from the pressure chamber 15, through a coiled pipe 16 in chamber 13 before entering expansion chamber 14, and said chamber 13 preferably contains cold water or other cooling agent which may be supplied and exhausted in any desired manner. In all other essentials, this modification is like the preferred form of the apparatus and the results accomplished are substantially the same.

A great many other changes might be made in the general form and arrangement of the parts described without departing from my invention, and hence, I do not restrict myself to the precise details set forth but consider myself at liberty to make such slight changes and alterations as fairly fall within the spirit and scope of my invention.

Having fully described my invention, what I claim as new and desire to secure by Letters-Patent, is:—

1. In a refrigerating machine, the combination with a pressure chamber, of an expansion chamber, a pipe connecting said chambers, and a loaded valve in said pipe, a pump taking water and gas from the expansion chamber and forcing them into the pressure chamber, a cooling coil in the pressure chamber, and means for automatically supplying gas to make up for losses in the system.

2. In a refrigerating machine, the combination with a pressure chamber, of an expansion chamber, a pipe connecting said chambers, a weighted valve in said pipe, a pump taking gas from the expansion chamber and forcing it into the pressure chamber and into water contained therein, a gas supply tank, a pipe connecting said tank with a part of the apparatus, a valve in said pipe, a diaphragm controlling said valve and located in a chamber, and a pipe connecting said chamber with the pressure chamber to control the operation of the diaphragm and valve.

In testimony whereof, I have signed this specification in the presence of two subscribing witnesses.

FRANK A. RIDER.

Witnesses:
CHARLES BARNETT,
W. H. WILSON.